United States Patent [19]

Malaval

[11] Patent Number: 4,639,350

[45] Date of Patent: Jan. 27, 1987

[54] COVER-PLUG FOR THE CORE OF A FAST NEUTRON NUCLEAR REACTOR

[75] Inventor: Claude Malaval, Antony, France

[73] Assignee: Novatome, Plessis-Robinson, France

[21] Appl. No.: 541,745

[22] Filed: Oct. 13, 1983

[30] Foreign Application Priority Data

Nov. 5, 1982 [FR] France ................................ 82-18570

[51] Int. Cl.[4] .............................................. G21C 13/06
[52] U.S. Cl. ...................................... 376/290; 376/353; 376/399; 376/460
[58] Field of Search ............... 376/290, 293, 294, 353, 376/399, 404, 460

[56] References Cited

U.S. PATENT DOCUMENTS

| 4,293,383 | 10/1981 | Lakra et al. | 376/290 |
| 4,309,252 | 1/1982 | Gilroy | 376/460 |
| 4,457,890 | 7/1984 | Scott | 376/293 |

FOREIGN PATENT DOCUMENTS

| 1908379 | 9/1970 | Fed. Rep. of Germany | 376/294 |
| 1218034 | 5/1960 | France | 376/293 |
| 1497755 | 1/1978 | United Kingdom | 376/399 |

Primary Examiner—Harvey E. Behrend
Assistant Examiner—Richard W. Wendtland
Attorney, Agent, or Firm—Pollock, Vande Sande & Priddy

[57] ABSTRACT

Cover-plug for the core of a fast neutron nuclear reactor, comprising a support-plate (6), a cylindrical shell (8) having a vertical axis fixed integrally to the support plate (6) and braces (14) which are transverse relative to the shell (8). Vertical tubes fixed to the support plate (6) at their upper part are joined to the braces (14), which consist of at least two conical webs (14) having their axes coincident with the axis of the shell (8). These conical webs have a top angle greater than 120° and a diameter which is slightly smaller than the diameter of the shell (8), at their base. The brace (14a) situated in the lowest position in the shell (8) ensures the deflection of the reactor cooling fluid. The invention applies, in particular, to fast neutron nuclear reactors of the integrated type.

6 Claims, 3 Drawing Figures

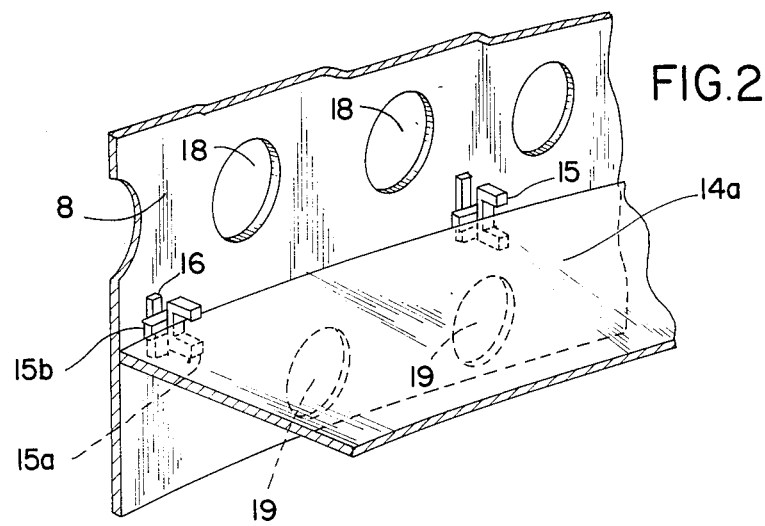
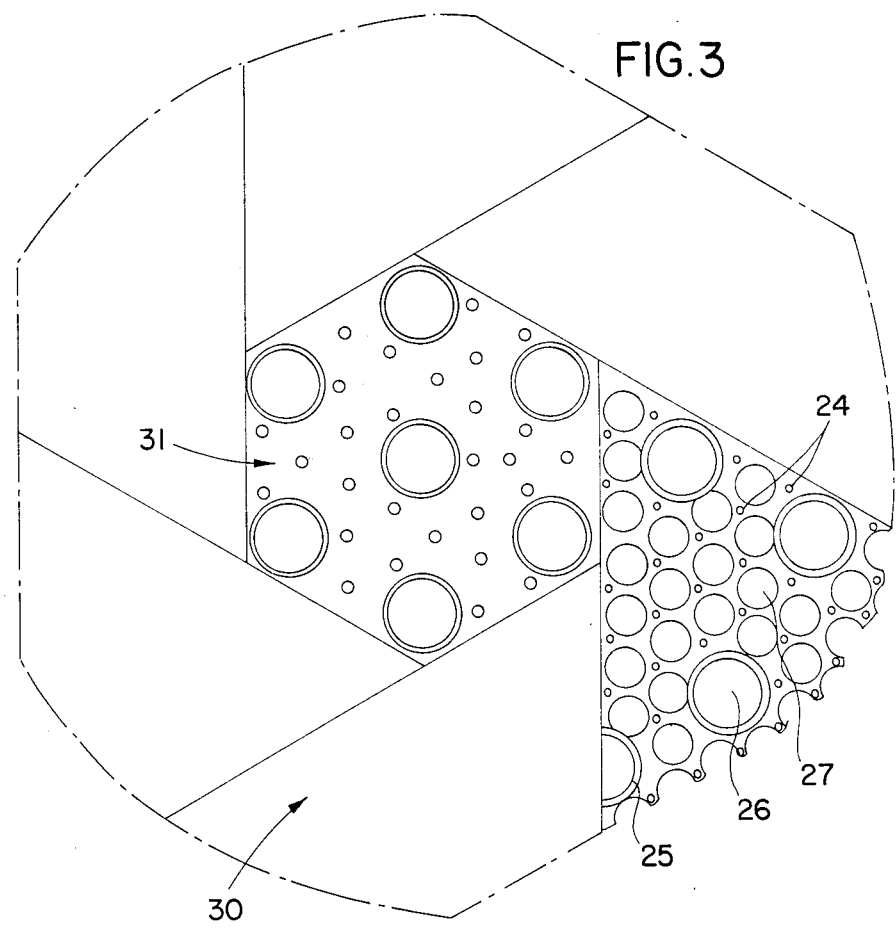

COVER-PLUG FOR THE CORE OF A FAST NEUTRON NUCLEAR REACTOR

FIELD OF THE INVENTION

The invention relates to the cover-plug for the core of a fast neutron nuclear reactor.

BACKGROUND OF THE INVENTION

The fast neutron nuclear reactors which are usually cooled with a liquid metal such as sodium comprise a vessel closed by a horizontal slab of great thickness and filled with liquid sodium coolant in which the core of the reactor is submerged. Above the core is arranged a unit called "core cover plug" which supports the control rod shroud tubes and all the instrumentation of the core, comprising in particular the tubes for sodium sampling at the exit of the assemblies. This core cover plug also ensures with its lower part the deflection of the sodium stream leaving the core to direct it towards the intermediate exchangers at the periphery of the vessel.

The core cover plug consists of a cylindrical shell with a vertical axis whose upper part is fixed to a support plate resting on a part of the reactor slab round the opening for the passage of the core cover plug through the slab. This passage opening is provided in the small turning plug which is mounted for rotational movement around a vertical axis in the large turning plug, which is itself mounted for rotational movement around a vertical axis on the fixed part of the slab.

The control rod shroud tubes as well as tubes for instrumentation are fixed at their upper part on the support plate and pass vertically through the cylindrical shell. To these tubes are fixed, rigidly, braces which are transverse with respect to the cylindrical shell of the core cover plug.

This unit, whose height is great relative to its diameter, is immersed in the vessel vertically above the core and comprises in its lower part a grid which is fixed to the control rod shroud tubes and which supports the sodium sampling tubes.

Such a unit of a great height comprising a rigid structure is subjected to mechanical stresses and thermal stresses of a high amplitude.

In French Pat. No. 2,289,031, it was proposed to reduce the thermal stresses by providing for openings in the vertical shell of the cover plug and other openings in the braces. Fixed to the lower part of the cover plug, just above the core, there is a flat horizontal plate which is pierced over a large part of its surface and permits the passage and the channelling of the liquid sodium which enters inside the cylindrical shell through openings provided in the braces and leaves this cylindrical shell through openings provided in its side surface. A better balance of the temperatures is thus obtained, and hence a reduction in the thermal stresses in the cover plug-core structure.

However, this arrangement has the disadvantage of not distributing the sodium in a completely adequate manner and of not dispersing the energy of the jet leaving the core. As a result, a high speed jet strikes the vessel and rises vertically along it, producing strong disturbances at the free surface and an asymmetrical supply to the exchangers arranged laterally relative to the core.

Finally, the overly rigid structure of the core cover plug remains sensitive to thermal shocks which can occur during changes in operation of the nuclear reactor.

SUMMARY OF THE INVENTION

The aim of the invention is therefore to propose a cover plug for the core of a fast neutron nuclear reactor, ensuring the fixing and the guidance of the control rods and of the core instrumentation, as well as the dispersion and the deflection of the cooling fluid leaving the core, and comprising a support plate resting on the turning plug closing the reactor vessel, around the opening for passage of the core cover plug in the turning plug, a cylindrical shell with a vertical axis fixed integrally to the support plate at its upper part, a plug for radiation protection occupying the internal volume of the cylindrical shell over a height which corresponds substantially to the thickness of the turning plug, and a set of vertical tubes intended to receive the reactor control rods, which are fixed to the support plate at their upper part, arranged within the cylindrical shell and connected to braces which are transverse relative to the shell, this cover plug ensuring efficient channelling of the cooling fluid towards the heat exchangers as well as an adequate dispersion of this fluid and resistance to mechanical and thermal stresses improved over that of prior art cover plugs.

For this purpose, the set of the braces which are fixed to the tubes, inside the shell, consists of at least two conical webs having an axis coinciding with the axis of the shell, a top angle greater than 120° and an external diameter which is slightly smaller than the internal diameter of the shell, a clearance existing between the inner surface of the shell and the outer edge of the braces which are held in an axial position fixed relative to the cylindrical shell by abutments which are integral with this shell, the brace situated in the lowest position in the cylindrical shell which has no sodium passage hole being arranged with its outer surface directed downwards, close to the lower part of the shell which is pierced with openings on either side of the lower brace providing the deflection of the cooling fluid.

BRIEF DESCRIPTION OF THE DRAWINGS

In order that the invention may be more clearly understood, an embodiment of a cover plug for the core of a fast neutron nuclear reactor according to the invention will now be described by way of example.

FIG. 2 is a perspective view of a peripheral part of a brace and the devices for axial fixing of this brace.

FIG. 3 shows, in a view in the direction of arrow of FIG. 1, the lower part of the core cover plug comprising a grid for holding the sampling tubes.

DETAILED DESCRIPTION

Figure 1:
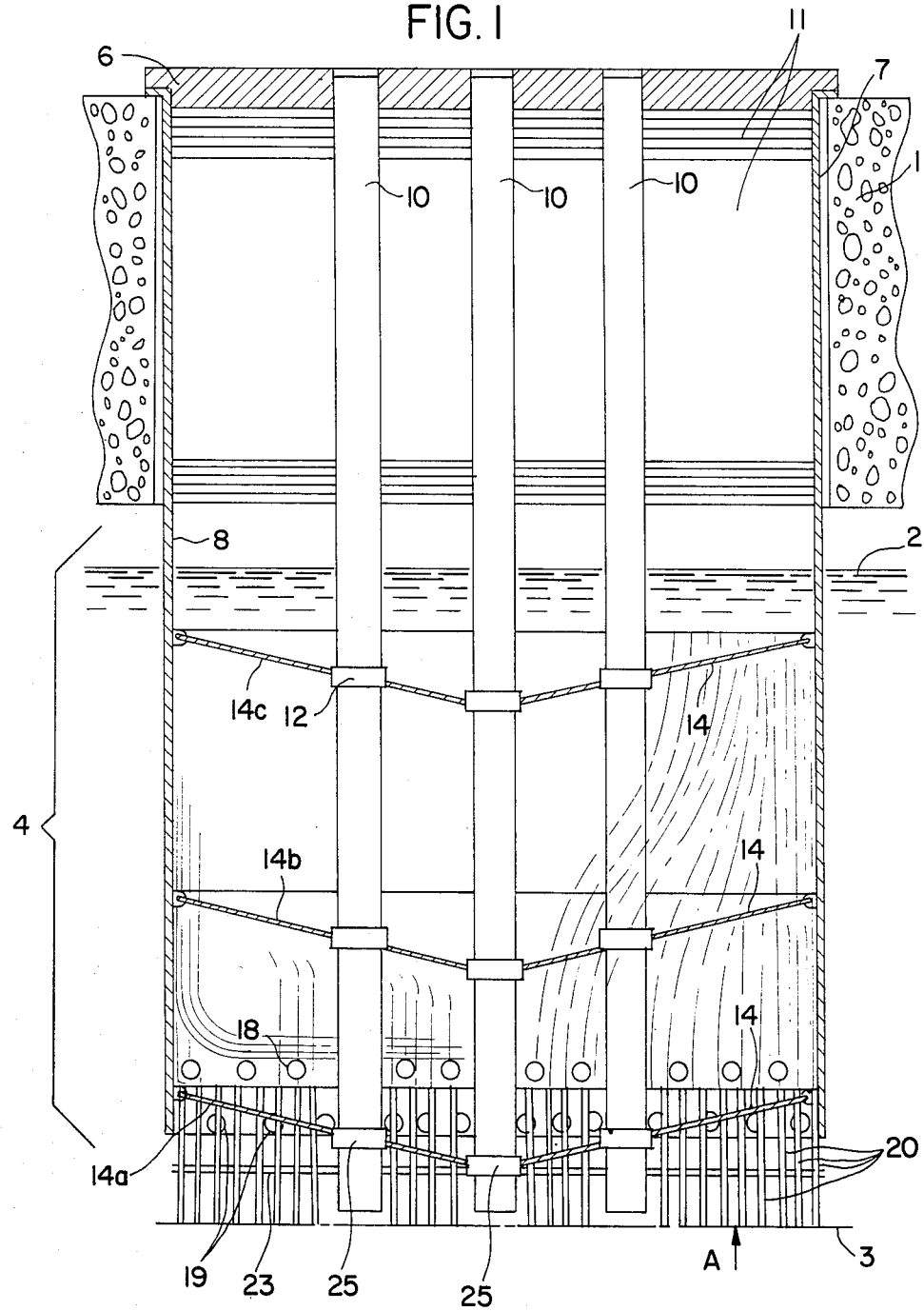
FIG. 1 is a vertical section view of a core cover invention.

FIG. 1 shows the small, very thick turning plug 1 of a fast neutron nuclear reactor, which rests on the large turning plug (not shown), itself resting on the slab, the whole unit closing the vessel of the reactor filled up to the level 2 with liquid sodium, ensuring the cooling of the core assemblies.

The core of the reactor consists of assemblies arranged vertically inside the vessel and immersed in the liquid sodium below the level 2. The upper level of the heads of the fuel assemblies forming the core is shown at 3.

The core cover plug of this reactor, indicated generally at 4, is arranged vertically above the reactor core.

This core cover-plug comprises a support plate 6 resting with its peripheral part on the small plug 1 turning around the opening for the passage 7 of the cover-plug for the core of the reactor. The small turning plug is mounted for rotation around a vertical axis on the large turning plug, itself mounted for rotation around a vertical axis on the peripheral fixed part of the reactor slab.

The core cover plug 4 comprises a cylindrical shell of great length 8 fixed at its upper part to the support plate 6. The cylindrical shell 8 has a diameter which is slightly smaller than the diameter of the passage 7 in the small turning plug 1.

FIG. 1 shows three shroud tubes or guide tubes 10 which serve to support and to guide the rod mechanisms and the control rods of the reactor. These tubes 10 are fixed at their upper part to the support plate 6 and pass vertically through the whole of the cylindrical shell 8 of the core cover plug.

Over the entire cross section of the small turning plug 1 the cylindrical shell 8 is filled with a material for radiation protection, consisting of superposed steel plates 11.

Inside the shell 8, the tubes 10 are rigidly connected through the intermediacy of fixing rings 12 to conical webs 14 forming the transverse braces of the structure of the core cover plug 4. These webs 14 are in the shape of cones having a top angle close to 160° and directed with the top downwards, i.e., with their outer surface directed towards the lower part of the core cover plug 4.

The diameter of the base of these conical shells or the outer diameter of the shell is a little smaller then the inner diameter of the cylindrical shell 8. The axes of these braces coinciding with the axis of the cylindrical shell 8, a clearance exists between the outer edge of the brace and the inner surface of the cylindrical shell 8 over the entire periphery of the brace.

In the case of a cover plug for the core of a fast neutron nuclear reactor as built at present, having a diameter slightly under 5 meters, the conical webs employed consist of a metal sheet 20 to 25 mm in thickness, the clearance between the conical shell and the cylindrical shell being 30 mm. Such a core cover plug encloses thirty control rod tubes 10 and a central channel tube permitting the introduction of devices for measurement or for sampling vertically above the core, in its center part.

The upper two webs 14, which are arranged according to the height of the core cover plug are practically identical and have some openings in addition to those required for the passage of the control rod tubes or other instrumentation tubes, while the lower web has no additional hole. The liquid sodium leaving the core can pass inside the core cover plug only through the space provided between the conical shells and the cylindrical shell.

The control rod shroud tubes 10, as well as the other instrumentation tubes, are also completely continuous over their whole length, which was not the case for all the tubes in the core cover plugs according to the prior art. These tubes are closed at their upper part, so that they contain stagnant sodium and so that no sodium circulation takes place in their inner volume.

As can be seen in FIGS. 1 and 2, the conical shells 14 are held in an axial position relative to the cylindrical shell 8 by abutments 15 comprising a central fastening 15a for engaging the outer edge of the conical web 14. These abutments are fixed by welding inside oblong slots 16 which are provided in the wall of the shell 8, permitting a preliminary height adjustment of the abutment 15 by virtue of its rear fixing part 15b.

Twelve abutments 15 arranged at 30° in a horizontal plane over the inenr surface of the shell 8 are employed for each of the conical webs 14.

On either side of the lower shell 14a, the side wall of the cylindrical shell 8 is pierced with openings 18 and 19, the openings 18 being arranged above the shell 14a and the openings 19 below the shell 14a. These are the only openings provided in the side surface of the cylindrical shell 8, except for the oblong holes 16 for fixing the small abutments 15, which are at least partially closed again after the abutments 15 are fixed.

The upper row of openings 18 comprises fifty openings, 145 mm in diameter, 80 mm above the conical shell.

The lower row of openings 19 comprises fifty openings, also 145 mm in diameter, arranged 220 mm below the openings 18.

The lower conical web 14a also carries vertical sampling tubes 20 passing through the conical web 14a and fixed to it by welding. Each of the sampling tubes is arranged exactly vertically above an assembly and permits the sampling of sodium at the outlet of this assembly for the detection of possible leakages.

The sodium samples obtained through the tubes 20 are collected inside the core cover plug to be directed towards a unit for locating possible can rupture.

FIG. 3 shows the lower part of the core coverplug consisting of a flat horizontal plate 23 and pierced over most of its surface (90% of the surface area consists of openings).

This antivibration grid 23 makes it possible to hold the sampling tubes 20, a lattice of holes 24 which corresponds to the assembly lattice being machined in the grid 23. The grid 23 is held by the tubes 10 whose lower part equipped with a fixing ring 25 is engaged in the holes 26 of the grid 23.

Finally, the grid 23 comprises a lattice of holes 27 which are different from the holes 24 and 26, permitting the channelling of the stream of sodium leaving the core at the upper part of the assemblies.

As can be seen in FIG. 3, the grid 23 consists of an assembly of six segments 30 placed side-by-side and held by the tubes 10.

There is no component in the central part 31, the length of the sampling tubes 20 being insufficient for them to vibrate.

The channelling of the sodium through the holes 27 is similarly not essential in this central part of the grid.

The sodium leaving the core moves vertically upwards, a small fraction of the flow entering the sampling tubes 20 for the detection of possible can ruptures.

Virtually all of the sodium flow reaches the grid 23 and crosses this grid through the channelling openings for the sodium flow 27. In fact, all the other openings in the grid 23 are closed either by the sampling tubes 20 or by the tubes 10 which are closed in their upper part and do not allow sodium to circulate.

The sodium flow therefore strikes the lower shell 14a which acts as a deflector for this sodium flow which is diverted sideways towards the peripheral part of the vessel containing the heat exchangers.

A part of the sodium is diverted directly into the peripheral part of the vessel without having entered the cylindrical shell 8, another part is diverted through the openings 19, and finally the remainder of the sodium reaching the peripheral part of the conical brace 14a passes through the clearance between this conical shell and the inner surface of the cylindrical shell 8 and is virtually totally discharged through the openings 18.

A very small fraction of the sodium circulates in the cylindrical shell passing through the clearance which exists between the inner edge of the shells 14b and 14c and the inner surface of the shell 8.

The main flow of sodium is therefore channelled through the space existing between the grid 23 and the conical shell 14a. This space has a flow cross-section which increases from the interior outwards. The speed of the sodium flow tends therefore not only not to increase, but to actually decrease from the interior outwards.

The sodium flow is therefore calmed, which is beneficial for the firmness of the components forming the internal structure of the reactor for the distribution of the sodium towards the exchangers and for the calming of the free surface.

Furthermore, the non-rigid structure of the core cover plug permits improved resistance to mechanical or thermal stresses in the reactor.

The cylindrical shell 8 is, in fact, locked in point contact through the tubes 15 in the radial directions relative to the braces 14, which produces a polygonal elastic deformation of the cylindrical shell resulting in small stresses. Under axial forces, the shells 14, by virtue of their conical shape, can deform elastically to accommodate the relative movements of the shell 8 and the tubes 10, for example under the effect of differential expansions.

The main advantages of the device according to the invention are therefore to permit limited deformations of the structure of the core cover plug, making it possible to reduce the stresses experienced thereby during the operation of the reactor. These stresses may be of thermal origin (alteration in the thermal regime of the reactor) or of an origin which is mechanical and extraneous to the reactor (for example earth tremors). Moreover, the deflection and the channelling of the liquid sodium leaving the core are produced in an optimum manner and are accompanied by a calming of the sodium stream.

Finally, construction and assembly of the core cover plug are greatly facilitated relative to those of core cover plugs according to the prior art.

It is possible to employ any number of conical shells (but at least two) acting as braces inside the cylindrical shell.

It is also possible to envisage fixing the sampling tubes to the second conical shell and to fit them without clearance into openings provided in the lower conical shell serving as a deflector for the liquid metal.

The core cover plug according to the invention can comprise all the features required for transmitting the core instrumentation, even though these features have not been described in detail.

The protective plug forming the upper part of the core cover plug can be produced in a way which differs from that described, for example by stacking or superposing bulky components instead of plates of relatively small thickness.

It is also possible to alter according to the requirements the size and the distribution of the sodium passage openings in the lower part of the cylindrical shell.

It is possible to choose a top angle of the conical shells which is different from 160° and even to employ successive shells with different opening angles. However, these opening angles must be greater than 120° to satisfy the requirements of the invention.

Finally, the core cover plug according to the invention applies to all fast neutron nuclear reactors employing a cooling fluid passing upwards through the core and collected, after being heated in the core, in the peripheral part of the reactor vessel.

I claim:

1. A fast neutron nuclear reactor comprising a reactor vessel, a core, control rods, a cooling fluid contained in said reactor vessel, core instrumentation and a cover plug comprising a support plate resting on a turning plug (1) closing said reactor vessel, around an opening for passage (7) of said core cover-plug (4) into said turning plug (1), a cylindrical shell (8) having a vertical axis and fixed integrally to said support plate (6) at its upper part, a plug for radiation protection (11) occupying the internal volume of said cylindrical shell over a height which corresponds substantially to the thickness of said turning plug, and a set of vertical tubes (10) for receiving said control rods, said vertical tubes being fixed to said support plate (6) at their upper ends, arranged within said cylindrical shell (8) and connected to braces (14) having outer edges and arranged transversely relative to said shell (8), wherein (a) a set of said braces (14) which are fixed to said tubes (10), inside said shell (8) consists of at least two vertically spaced conical webs (14) having an axis coinciding with the axis of said shell (8), a top angle greater than 120° and an external diameter which is slightly smaller than the internal diameter of said shell (8), a clearance existing between the inner surface of said shell (8) and said outer edge of said braces (14);

(b) said braces (14) are held in an axial position relative to said cylindrical shell (8) by abutments (15) which are integral with said shell (8) each of said braces having openings only large enough to allow passage of said vertical tubes therethrough, the upper of said at least two braces having additional passages allowing passage of sodium therethrough; and (c) the lowermost brace (14a) is free of any additional sodium passage holes and is arranged with its outer surface directed downwardly, said lowermost brace being held by said abutments just above the lower part of said shell (8) said shell being pierced with openings (18, 19) only in the lower portion thereof, said openings (18, 19) being on either side of said lowermost brace (14a) enabling deflection of said cooling fluid.

2. A fast neutron nuclear reactor as claimed in claim 1, wherein said vertical tubes (10) are continuous over their entire length and are closed in their upper part, in the region of said support plate (6).

3. A fast neutron nuclear reactor as claimed in claim 1, in the case of a cover plug having a diameter slightly under five meters, which comprises at least two said braces consisting of conical shells having a top angle close to 160°, arranged within said cylindrical shell with a clearance close to 30 mm.

4. A fast neutron nuclear reactor as claimed in claim 1, comprising in its lower part a flat horizontal grid, fixed to said tubes (10) and comprising openings for the passage of instrumentation tubes (20) as well as holes for passage (27) of cooling fluid, said grid (23) consisting of several identical parts placed side-by-side, fixed to said tubes (10) and held in relation to each other by means of said tubes (10).

5. A fast neutron nuclear reactor as claimed in claim 4, wherein said instrumentation tubes (20) are fixed to said lowermost brace (14a) in the region of openings provided in the latter and are fitted in holes (24) of said grid.

6. A fast neutron nuclear reactor as claimed in claim 4, wherein said instrumentation tubes (20) are fixed to a second brace (14b) arranged just above said lowermost brace (14a) for deflecting said cooling fluid through openings provided in said second brace (14b) and are fitted with a small clearance in the openings provided in said lowermost brace (14a).

* * * * *